United States Patent [19]
Albizzati et al.

[11] Patent Number: 4,971,937
[45] Date of Patent: Nov. 20, 1990

[54] COMPONENTS AND CATALYSTS FOR THE POLYMERIZATION OF OLEFINS

[75] Inventors: Enrico Albizzati, Arona; Pier C. Barbe; Luciano Noristi, both of Ferrara; Raimondo Scordamaglia, Milan; Luisa Barino, Novara; Umberto Giannini, Milan; Giampiero Morini, Voghera, all of Italy

[73] Assignee: Himont Incorporated, Wilmington, Del.

[21] Appl. No.: 413,410

[22] Filed: Sep. 27, 1989

[30] Foreign Application Priority Data

Sep. 30, 1988 [IT] Italy ................. 22150 A/88

[51] Int. Cl.$^5$ ............................................. C08F 4/646
[52] U.S. Cl. .................................. 502/126; 502/123; 502/134; 526/125
[58] Field of Search ................... 502/123, 126, 134

[56] References Cited

U.S. PATENT DOCUMENTS

| | | | |
|---|---|---|---|
| 4,246,383 | 1/1981 | Gessell | 502/134 X |
| 4,298,718 | 11/1981 | Mayr et al. | 502/134 X |
| 4,400,303 | 8/1983 | Martin | 502/126 |
| 4,522,930 | 6/1985 | Albizatti et al. | 502/126 X |
| 4,762,898 | 8/1988 | Matsuura et al. | 502/126 X |

Primary Examiner—Patrick P. Garvin

[57] ABSTRACT

Solid catalyst components for the polymerization of olefins and modified with electron-donor compounds, comprising a titanium halide supported on a magnesium dihalide in active form and containing as an electron-donor compound a di- or other polyether having specific reactivity characteristics towards $MgCl_2$ and $TiCl_4$.

20 Claims, No Drawings

COMPONENTS AND CATALYSTS FOR THE POLYMERIZATION OF OLEFINS

DESCRIPTION

The present invention relates to solid components of catalysts for the polymerization of olefins and the catalysts obtained therefrom. Catalysts including titanium compounds supported on magnesium halides in active form are well known in the art.

Catalysts of this type were described for the first time in the U.S. Pat. No. 4,298,718. Said catalysts are based on titanium tetrahalides supported on halides of magnesium in active form.

Although the catalysts have high activity in the polymerization of ethylene as well as alpha olefins like propylene and butene-1, they are not very stereospecific.

Improvements to stereospecificity have been made by adding electron-donor compounds to the solid catalyst component (U.S. Pat. No. 4,544,717).

Substantial improvements were made using, in addition in the electron-donor present in the solid component, an electron-donor added to the Al-alkyl co-catalyst component (U.S. Pat. No. 4,107,414).

The catalysts modified in this manner although they are highly stereospecific (isotactic index about 94–95) still do not show sufficiently high levels of activity.

Significant improvements in activity and stereospecificity were obtained by preparing the solid catalytic component according to the technique described in U.S. Pat. No. 4,226,741.

High level performance in catalyst activity as well as stereospecificity have been obtained with the catalysts described in European patent No. 045977. Said catalysts have as a solid catalyst component, a magnesium halide in active form on which is supported a titanium halide preferably TiCl$_4$ and an electron-donor compound selected from specific classes of carboxylic acid esters, of which the phthalates are typical examples, and, as a co-catalyst component, a system formed of an Al-trialkyl compound and a silicon compound containing at least one Si-OR bond (R is a hydrocarbyl radical). After the appearance of the above mentioned patents, which marked the fundamental step in the development of coordination catalysts supported on magnesium halides, many patents have been filed directed modifying and/or improving the performance of the above mentioned catalysts.

In the prolific patent and scientific literature available, however, there is no description of catalysts endowed with both high activity and stereospecificity in which the electron-donor of the solid catalyst component is the only donor present in the catalyst system. The catalysts known up to now that have both high activity and stereospecificity always include the use of an electron-donor in the solid catalyst component and in the co-catalyst component.

Surprisingly, it has now been found that it is possible to prepare highly active and stereospecific catalysts where the only donor used is present in the solid catalyst component.

The donors used in the catalysts of this invention are ethers with two or more ether groups, which satisfy particular requisites of reactivity towards magnesium dichloride and titanium tetrachloride.

The ethers of the invention form complexes with magnesium dichloride but in a quantity of less than 60 mmoles per 100 g of MgCl$_2$. With TiCl$_4$ the ethers do not undergo substitution reactions or they do so at less than 50% by moles.

Preferred are ethers which form complexes with magnesium chloride in quantities comprised between 20 and 50 mmoles, and react with TiCl$_4$ at less than 30%.

The procedures for testing complexation with magnesium chloride and reaction with TiCl$_4$ are reported below.

Examples of suitable ethers which satisfy the reactivity criterion set forth above are 1,3-diethers of formula:

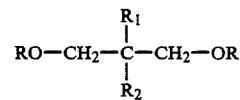

where R, R$_1$ and R$_2$ independently are linear or branched alkyl, cycloaliphatic, aryl, alkylaryl or arylalkyl radicals with 1-18 carbon atoms, and R$_1$ or R$_2$ may also be hydrogen.

In particular R is an alkyl radical with 1-6 carbon atoms, and more specifically it is methyl. In this case, when R$_1$ is methyl, ethyl, propyl or isopropyl, R$_2$ may be ethyl, propyl, isopropyl, butyl, isobutyl, t-butyl, 2-ethylhexyl, cyclohexyl methyl, phenyl, or benzyl; when R$_1$ is hydrogen, R$_2$ can be ethyl, butyl, sec.butyl, t-butyl, 2-ethylhexyl, cyclohexylethyl, diphenylmethyl, p-chlorophenyl, 1-naphthyl, 1-decahydronaphthyl; R$_1$ and R$_2$ can be the same and can be ethyl, propyl, isopropyl, butyl, isobutyl, t-butyl, neopentyl, isopentyl, phenyl, benzyl or cyclohexyl.

Examples of representative ethers that are included in the above formula are: 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-diethoxypropane, 2-cumyl-1,3-diethoxypropane, 2-(2-phenylethyl)-1,3-dimethoxypropane, 2-(2-cyclohexylethyl)-1,3-dimethoxypropane, 2-(p-chlorophenyl)1,3-dimethoxypropane, 2-(diphenylmethyl)-1,3-dimethoxypropane, 2-(1-naphthyl)-1,3-dimethoxy propane, 2,2-fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl2-ethyl-1,3-dimethoxypropane, 2-methyl-2-propyl-1,3-dimethoxypropane, 2-methyl-2-benzyl-1,3-dimethoxypropane, 2-methyl2-phenyl-1,3-dimethoxypropane, 2-methyl-2-cyclohexyl-1,3-dimethoxypropane, 2,2-bis(p-chlorophenyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethyl-hexyl)-1,3-dimethoxy propane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-disec-butyl-1,3-dimethoxypropane, 2,2-di-tertbutyl-1,3-dimethoxypropane, 2,2-di-neopentyl-1,3-dimethoxy-propane, 2-isopropyl-2-isopentyl-1,3-dimethoxypropane, 2-phenyl-2-benzyl-1,3dimethoxypropane, 2- cyclohexyl-2-cyclohexylmethyl-1,3-dimethoxypropane.

Other suitable ethers are: 2,3-diphenyl-1,4-diethoxybutane, 2,3-dicyclohexyl-1,4-diethoxybutane, 2,2-dibenzyl1,4-diethoxybutane, 2,3-dibenzyl-1,4-dimethoxybutane, 2,3-dicyclohexyl-1,4-dimethoxybutane, 2,3-diisopropyl-1,4-diethoxybutane, 2,2-bis(p-methylphenyl)1,4-dimethoxybutane, 2,3-bis(p-chlorophenyl)1,4-dimethoxybutane, 2,3-bis(p-fluorophenyl)1,4-dimethoxybutane, 2,4-diphenyl-1,5-dimethoxypentane, 2,5-diphenyl-1,6-dimethoxypentane, 2,4-diisopropyl1,5-dimethoxypentane, 2,5-diphenyl-1,6-dimethoxypentane, 3-methoxymethyltetrahydrofuran, 3-methoxymethyldioxane, 1,1-dimethoxymethyldecahydronaphthalene, 1,1-dimethoxymethylindane, 2,2-dimethoxymethylindane, 1,1-dimethoxymethyl-2-isopropyl-5-methylcyclohexane, 1,3-diisoamyloxypropane, 1,2-diisobutoxypropane, 1,2-diisobutoxyethane, 1,3-diisoamyloxypropane, 1,2-diisoamyloxyethane, 1,3-dineopentoxypropane, 2,2-tetramethylene-1,3-dimethoxypropane, 1,2-dineopentoxyethane, 2,2-tetramethylene-1,3-dimethoxypropane, 2,2-pentamethylene-1,3-dimethoxypropane, 2,2-pentamethylene-1,3-dimethoxypropane, 2,2-hexamethylene-1,3-dimethoxypropane, 1,2-bis(methoxymethyl)cyclohexane, 2,8-dioxaspiro[5,5]undecane, 3,7-dioxabicyclo[3,3,1]nonane, 3,7-dioxabicyclo[3,3,0]octane, 3,3-diisobutyl-1,5-dioxononane, 6,6-diisobutyldioxyheptane, 1,1-dimethoxymethylcyclopropane, 1,1-bis[dimethoxymethyl] cyclohexane, 1,1-bis[methoxymethyl]bicyclo[2,2,1]heptane, 1,1-dimethoxymethyl cyclopentane, 2-methyl-2-methoxymethyl1,3-dimethoxypropane.

The ethers preferred are the 1,3-diethers belonging to the general formula indicated above and in particular those where R is methyl and $R_1$ and $R_2$, independently, are isopropyl, isobutyl, t-butyl, cyclohexyl, isopentyl, cyclohexylethyl. Ethers particularly preferred are 2,2-diisobutyl-1,3-dimethoxypropane; 2-isopropyl 2-isopentyl-1,3-dimethoxypropane; 2,2-bis(cyclohexylmethyl)-1,3-dimethoxypropane.

The ether complexing test with $MgCl_2$ is conducted as follows.

In a 100 ml flask with fixed blade mechanical agitator are introduced in a nitrogen atmosphere, in order:

70 ml anhydrous n-heptane 12 mmoles anhydrous $MgCl_2$ activated as described below 2 mmoles ether.

The ingredients are heated at 60° C. for 4 hours (stirring speed 400 rpm) then filtered and washed at room temperature with 100 ml n-heptane and dried with mechanical pump.

The quantity of ether complexed is determined, after treatment of the solid with 100 ml of ethane, by quantitative gas chromatographic analysis.

The data relative to the complexing test are shown in Table 1.

The test for reactivity with $TiCl_4$ is conducted as follows. In a 25 ml test tube with a magnetic agitator are introduced, in a nitrogen atmosphere, in order:

10 ml anhydrous n-heptane 5 mmoles $TiCl_4$ 1 mmole ether donor

The ingredients are heated at 70° for 30 min then cooled at 25° C. and decomposed with 90 ml of ethanol.

The solution obtained is analyzed gas chromatographically using a standard HIMONT method available upon request, with a Carlo Erba HRGC 5300 Mega Series gas chromatograph with a 25 meter Chrompack CP-SIL 5 CB capillary column. The data relative to the reactivity tests are shown in Table 1.

The magnesium dichloride used in the complexing test with the ethers is prepared as follows. In a 1 l container of a vibrating mill (Siebtechnik's Vibratrom) containing 1.8 kg of steel spheres 16 mm in diameter, are introduced under a nitrogen atmosphere, 50 g anhydrous $MgCl_2$ and 6.8 ml 1,2 dichloroethane (DCE). The mixture is milled at room temperature for 96 hours, after which the solid obtained is dried at 50° C. for 16 hours under vacuum of a mechanical pump. Solid characterization In the X-ray powder spectrum:

half peak breadth of D110 reflection = 1.15 cm;

presence of a halo with maximum intensity at angle 2 $\theta = 32.1°$;

Surface area (B.E.T.) = 125 m²/g;

Residual DCE = 2.5% by weight.

TABLE 1

| Ether | Complexing with MgCl2 (*) | Reaction with TiCl4 (**) |
|---|---|---|
| 2,2-dimethyl-1,3-dimethoxypropane | 3,5 | 80 |
| 2-methyl-2-isopropyl-1,3-dimethoxypropane | 1,6 | 71 |
| 2,2-diisobutyl-1,3-dimethoxypropane | 3,3 | 98 |
| 2,2-diisobutyl-1,3-diethoxypropane | 2,0 | 100 |
| 2,2-diisobutyl-1,3-di-n-butoxypropane | 0,5 | 97 |
| 2,2-diphenyl-1,3-dimethoxypropane | 0,7 | 75 |
| 2,2-bis (cyclohexylmethyl)-1,3-dimethoxypropane | 1,8 | 85 |
| 1,3-diisobutoxypropane | 2,6 | 99 |
| 2,2-pentamethylene-1,3-dimethoxypropane | 2,4 | 100 |
| 1,1-bis(methoxymethyl) bicyclo-(2,2,1-heptane) | 1,9 | 93 |
| 1,3 dimethoxypropane | 9,6 | 100 |
| 1-isopropyl-2,2-dimethyl-1,3-dimethoxypropane | 1,3 | 0 |
| 2-isopentyl-2-isopropyl-1,3-dimethoxypropane | 2,5 | 98 |
| 1,2 dimethoxyethane | 9,4 | 76 |

(*)Moles of ether × 100 complexed by 100 g of MgCl2
(**)Percentage in moles of ether recovered after reaction with TiCl4

The preparation of the solid catalyst component containing the ethers of the invention is carried out according to various methods. For example, the magnesium dihalide (used in anhydrous state containing less than 1% of water), the titanium compound and the di or polyether are ground together under conditions where activation of the magnesium dihalide occurs. The milled product is then treated one or more times with $TiCl_4$ in excess at temperatures between 80° and 135° C. and then washed repeatedly with a hydrocarbon, i.e. hexane, until all chlorine ions disappear.

According to another method, the anhydrous magnesium dihalide is preactivated according to known methods in the prior art and then reacted with an excess of $TiCl_4$ which contains the ether compound in solution, at temperatures between 80° and 135° C. The treatment with $TiCl_4$ is repeated and the solid is then washed with hexane to eliminate all traces of unreacted $TiCl_4$.

According to another method, a $MgCl_2$ nROH adduct (particularly in form of spheroidal particles) in which n is a number from 1 to 3, and ROH is ethanol, butanol, or isobutanol, is treated with an excess of TiCl4 containing the ether compound in solution at a temperature generally between 80° and 120° C. After the reaction, the solid is treated once more with TiCl4, then separated and washed with a hydrocarbon until the chlorine ions are removed.

According to another method, alcoholates or chloroalcoholates of magnesium, the chloroalcoholates prepared according to U.S. Pat. No. 4,220,554 are treated with TiCl4 in excess containing the ether compound in solution, under reaction conditions described above.

According to another method complexes of magnesium halide with titanium alcoholates for example the complex $MgCl_2 \cdot 2Ti(OC_4H_9)_4$ are treated, in a hydrocarbon solution, with TiCl4 in excess containing the ether compound in solution. The solid product is separated and further treated with an excess of TiCl4 and then separated and washed with hexane. The reaction with TiCl4 is conducted at temperatures between 80° and 120° C.

According to a variant of the above method, the complex between $MgCl_2$ and the titanium alcoholate is reacted in hydrocarbon solution with hydropolyxyloxane. The separated solid product is reacted at 50° C. with silicon tetrachloride containing the ether compound in solution and the solid is treated with TiCl4 in excess operating at 80°-100° C. It is possible to react with TiCl4, in excess, containing the ether compound in solution, porous styrene-divinylbenzene resins in spherical particle form, impregnated with solutions of compounds or complexes of Mg soluble in organic solvents.

The resins and their method of impregnation are described in U.S. patent application S.N. 07/359,234.

The reaction with TiCl4 is carried out at 80°-100° C. and after separating the TiCl4 excess, the reaction is repeated and the solid is then washed with a hydrocarbon.

The molar ratio MgCl2/ether compound used in the reactions indicated above is generally between 4:1 and 12:1.

The ether compound is fixed on the magnesium halide containing component in quantities generally between 5 and 20% mole However, in the case of components supported on resins, the molar ratio between fixed ether compound and the magnesium present is generally between 0.3 and 0.8.

In the catalytic components of the invention the ratio Mg/Ti is generally between 30:1 and 4:1; in the components supported on resins the ratio is lower, generally from 2:1 to 3:1.

The titanium compounds that can be used for the preparation of catalytic components are the halides and halogen alcoholates. Titanium tetrachloride is the preferred compound. Satisfactory results are obtained also with trihalides, particularly TiCl3 HR, TiCl3 ARA, and with haloalcoholates, such as TiCl3OR, where R is a phenyl radical.

The above mentioned reactions result in the formation of magnesium dihalide in active form.

In addition to these reactions, other reactions that result in the formation of magnesium dihalide in active form starting with magnesium compounds different from halides are well known in literature.

The active magnesium dihalides present in the solid catalyst components of the invention show in the X-ray powder spectrum of the catalyst component the replacement of the most intense diffraction line present in the powder spectrum of the non-activated magnesium halides having a surface area of less than 3 m$^2$/g by a halo with the maximum intensity peak shifted with respect to the position of the most intense diffraction line, or a half peak breadth of the most intense diffraction line at least 30% greater than the half peak breadth of the corresponding line of the non-activated magnesium halide. The most active forms are those where in the X-ray powder spectrum of the catalyst component a halo appears.

Among the magnesium dihalides, magnesium dichloride is the preferred compound. In the case of the most active forms of magnesium dichloride the halo appears in place of the diffraction line that is present in the spectrum of the non-active magnesium chloride at an interplanar distance of 2.56 Å. The solid catalyst component of the invention form, by reaction with Al-alkyl compounds, catalysts for the polymerization of olefins $CH_2=CHR$, where R is hydrogen, alkyl radical with 1-6C, or aryl radical, or mixtures of said olefins mixed with each other with or without diolefins.

The Al-alkyl compounds include Al-trialkyl such as Al-triethyl, Al-triisobutyl, Al-tri-n-butyl. Linear or cyclic Al-alkyl compounds containing two or more Al atoms linked to each other by O, N or S atoms may be used.

Examples of these compounds are:

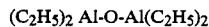

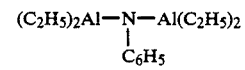

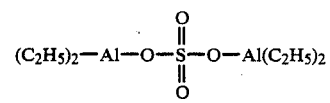

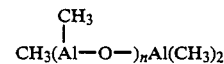

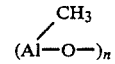

where n is a number between 1 and 20. Also one can use AlR2OR' compounds, where R' is an aryl radical substituted in position 2 and/or 6 and R is an alkyl radical with 1-6 carbon atoms, or AlR2H compounds.

The Al-alkyl compound is used in Al/Ti ratios generally between 1 and 100.

The trialkyl compounds may be used in mixtures with Al-alkyl halides, such as AlEt2Cl.

The polymerization of olefins is carried out according to known methods in a liquid phase of the monomer(s) or a solution of monomer(s) in an aliphatic or aromatic hydrocarbon solvent, or in gas phase, or with techniques using a combination of liquid phase and gas phase.

The (co)polymerization temperature is generally between 0° and 150° C., preferably between 60° and 100° C., while operating at atmospheric pressure or at a higher pressure.

The catalysts may be precontacted with small quantities of olefins (prepolymerization). The prepolymerization improves the catalyst performance as well as the polymer morphology.

The prepolymerization is carried out by maintaining the catalyst in suspension in a hydrocarbon solvent (hexane, heptane, etc.) while contacting small amounts of the monomer with the catalyst and polymerizing at a temperature between room temperature and 60° C. producing quantities of polymer included between 0.5 and 3 times the weight of the catalyst component. It may also be carried out in liquid or gaseous monomer, under the temperature conditions above, to produce quantities of polymer up to 1000 g per g of the catalyst component.

In case of stereoregular polymerization of olefins, in particular of propylene, some times it is convenient to use together with the Al-alkyl compound an electron-donor selected from 2,2,6,6-tetramethylpiperidine silicon compounds containing at least one Si-OR bond wherein R is a hydrocarbyl radical.

Preferably the silicon compounds have the formula $$R^I R^{II} Si(OR^{III})(OR^{IV})$$

where $R^I$ and $R^{II}$ independently, are branched alkyl, cycloaliphatic or aryls radicals with 1-12 carbon atoms; $R^{III}$ and $R^{IV}$ independently are alkyl radicals with 1-6 carbon atoms. Examples of such compounds are:

(t-butyl)$_2$ Si(OC$_3$)$_2$; (cyclohexyl)$_2$ Si(OCH$_3$)$_2$;

(isopropyl)$_2$ Si(OCH$_3$)$_2$; (sec-butyl)$_2$ Si(OCH$_3$)$_2$.

The molar ratio of Al-alkyl compound to electron-donor is usually between 5:1 and 100:1.

As indicated above, the catalysts find particular application in the polymerization of CH$_2$=CHR olefins where R is an alkyl radical with 1-6 carbon atoms or an aryl radical.

They are also particularly suited for the polymerization of ethylene and its mixtures with smaller proportions of alpha-olefins, such as butene-1, hexene-1 and octene-1 to form LLDPE, because the catalysts produce polymers with narrow molecular weight distribution.

In the copolymerization of ethylene with propylene, or other alpha-olefins or mixtures thereof to form elastomeric products copolymers are obtained having low crystallinity suitable therefore for the production of elastomers with highly valued qualities. The following examples illustrate the invention. In the examples, unless otherwise indicated, the percentages are by weight. The solubility in xylene is determined by thermo solubilizing the polymer (130° C.), cooling and then filtering it. The solubility is determined by the fraction soluble at 25° C. The insoluble residue substantially corresponds to the isotacticity index determined by extraction with boiling n-heptane (4 hours). Melt index E and F for polyethylene and L for polypropylene are determined according to ASTM D1238. Melt index E and F are measured at 190° C. with respective weights of 2.15 and 21.6 kg. The one for polypropylene is measured at 230° C. with a weight of 2.16 kg. The intrinsic viscosity is determined in tetralin at 135° C. Unless otherwise indicated, the isotacticity index (I.I.) has been determined by extraction with boiling n-heptane (4 hours).

Polymerization Procedure

A In liquid monomer

Procedure A.1

In a 4 l stainless steel autoclave equipped with an anchor agitator and previously purged with nitrogen flux at 70° C. for 1 hour, were introduced, under propylene flow at 30° C., 80 ml anhydrous n-hexane containing an adequate quantity of solid catalyst component and 6.9 mmoles of Al(Et)$_3$. The autoclave was closed and 120 ml of hydrogen was introduced. The agitator was inserted and 1.2 kg of liquid propylene, or other alpha-olefin monomer capable of being polymerized in liquid phase, was charged. The temperature was brought to 70° C. in 5 minutes and the polymerization was carried out for 2 hours. At the end of the test the unreacted propylene was removed, the polymer recovered and dried in an oven at 70° C. under nitrogen flow for 3 hours, and then characterized.

Procedure A.1.1

The procedure of A.1 above was followed except that added to the hexane was an appropriate quantity of an electron-donor together with Al(Et)$_3$ corresponding to a molar ratio Al/donor=20. The composition of the solid catalyst components and the ethers used, the polymerization yields and the properties of the polymers obtained are described in tables 2 and 3. In table 3 the donor used together with Al(Et)$_3$ is indicated in parenthesis.

B In solvent

Procedure B.2

A 2.5 l stainless steel autoclave, equipped with a thermostat and magnetic agitator, which was previously purged with nitrogen flux at 70° C. for 1 hour and washed 4 times successively with propylene, was heated to 45° C. and, under a light nitrogen flow, 870 ml of anhydrous hexane was charged. The catalyst suspension (catalyst component and Al-alkyl premixed immediately before the test in 130 ml solvent) wa then added. The autoclave was closed and 120 ml of hydrogen was fed from a calibrated cylinder. The agitator was inserted and the temperature was rapidly brought to 75° C. (in about 5 minutes). Gaseous propylene or other alpha-olefin monomer was then introduced up to a total pressure of 8 atm. This condition was maintained for 4 hours continuously feeding propylene or other monomers to replace the monomer polymerized. At the end of the polymerization the autoclave was rapidly degassed and cooled to 25°-30° C. The polymer suspension was then filtered, the solid part was dried in an oven at 70° C. in nitrogen for 4 hours and then weighed and analyzed. The filtrate was evaporated and the dry residue consisting of amorphous polymer was recovered and weighed. This was taken into consideration in calculating the total yield and the total isotactic index.

Procedure B.2.1

In a 2000 ml stainless steel autoclave, equipped with an anchor agitator, was introduced under a propylene flow at 25° C. 1000 ml n-heptane, 2.5 mmoles of Al(C$_2$H$_5$)$_3$ and an adequate quantity of the solid catalyst component. The autoclave was closed and the pressure brought to 1 atm. while feeding propylene, and an over-pressure of hydrogen equal to 0.2 atm was introduced. The reaction mixture was heated to 70° C. and the pressure brought to a total of 7 atm, by feeding propylene, and polymerized for 2 hours while continuing to feed the monomer to maintain the pressure at 7 atm. The polymer obtained was isolated by filtration and dried; the polymer remaining in the filtrate was precipitated in methanol, vacuum dried and considered in determining the total insoluble residue of the extraction with n-heptane. The composition of the solid catalyst components and ethers used and the polymerization yields and the properties of the polymers obtained are described in tables 2 and 3.

Procedure B.2.2

The polymerization methods described in procedure B.2.1. were followed except using 5 mmoles of Al($C_2H_5$)$_3$ together with an adequate quantity of electron donor such that the molar ratio Al/donor=20. The composition of the solid catalyst components, ether and electron donor (with the Al-alkyl compound) used and the polymerization yields and the properties of the polymers obtained are described in tables 2 and 3. In table 3 the donor used together with Al($C_2H_5$)$_3$ is indicated in parenthesis.

EXAMPLE 1

In a 1 l flask equipped with condenser, mechanical agitator and thermometer was introduced 625 ml TiCl$_4$ under nitrogen environment. 25 g of spherical MgCl$_2$.2.1C$_2$H$_5$OH support, obtained according to the procedures and ingredients of example 1 of U.S. Pat. No. 469 648, was fed into the flask at 0° C. with agitation and the contents were heated to 100° C. over 1 hour. When the temperature reached 40° C., 4.1 ml of 2,2-diisobutyl-1,3-dimethoxypropane was introduced, and the contents maintained at 100° C. for 2 hours, left to settle and the supernatant siphoned off. 550 ml of TiCl$_4$ was added to the solid and the contents were heated at 120° C. for 1 hour with agitation. The agitation was stopped, the solid was allowed to settle and the supernatant was removed by siphon. The residual solid was then washed 6 times with 200 ml portions of anhydrous hexane at 60° C. and 3 times at room temperature and dried under vacuum. The catalyst solid component contained 3.45% Ti and 2.6% 2,2-diisobutyl-1,3-dimethoxypropane. Propylene was polymerized according to procedure A.1 above for the liquid monomer using 0,76 g of Al($C_2H_5$)$_3$, 0.09 ml of hexane suspension containing 7.25 mg of solid catalyst component and 1000 ml hydrogen. 460 g of polymer was obtained. The polymer yield was 63.4 kg/g of catalyst component. The polymer had a 95.3% insoluble residue in xylene at 25° C., a melt index of 10.0 g/10' and a tamped bulk density of 0.48 g/ml.

EXAMPLE 2

In a 500 ml glass flask equipped with condenser, mechanical agitator and thermometer, was introduced, in an anhydrous nitrogen environment at 20° C., 285 ml of TiCl$_4$ and 20 g of C$_2$H$_5$OMgCl support prepared according to the precedure of U.S. Pat. No. 4,220,554. While agitating, the contents were heated to 70° C. in 30 minutes and then 4.7 ml 2,2-diisobutyl-1,3-dimethoxypropane was added and the contents were heated to 120° C. in 30 minutes. The temperature was maintained at 120° C. for 1 hour. The reaction mixture was allowed to settle and supernatant removed by siphon. Then another 285 ml TiCl$_4$ were added and the contents heated at 120° C. for 1 hour. The reaction mixture was allowed to settle and the supernatant removed by siphon. The residual solids were washed 5 times with 150 ml portions of anhydrous heptane at 80° C., and again at room temperature with 150 ml portions of anhydrous hexane until there were no chlorine ions in the wash liquid. The analysis of the vacuum dried solid catalyst component showed a content of 2.2% Ti and 12.2% 2,2-diisobutyl1,3-dimethoxypropane. Propylene was polymerized according to the Procedure A.1 above using 0.76 g Al($C_2H_5$)$_3$, 0.12 ml hexane suspension containing 13 mg of solid catalyst component and 1000 ml hydrogen. 240 g of polymer was obtained with a polymer yield of 18.4 kg/g catalyst component, 95.2% insoluble residue in xylene, at 25° C., a melt index of 10.6 g/10' and a tamped bulk density of 0.50 g/ml.

EXAMPLE 3

In a 350 ml porcelain jar containing 4 porcelain spheres, were introduced, under an anhydrous nitrogen environment, 9.2 g of commercial anhydrous MgCl$_2$ and 3.3 ml of 2,2-diisobutyl-1,3-dimethoxypropane. The jar was placed in a centrifugal mill operated at 350 rpm for 15 hours. In a 250 ml glass flask fitted with a condenser, mechanical agitator and thermometer, under an anhydrous nitrogen environment at room temperature, were introduced 8 g of the above milled product and 115 ml of TiCl$_4$. The contents were heated to 120° C. in 20 minutes and maintained at 120° C. for 2 hours. The solids were allowed to settle and supernatant was siphoned off. Another 115 ml of TiCl$_4$ was introduced, the contents were heated at 120° C. for 2 hour. The solids were allowed to settle and the supernatant removed by siphone. The solid residue was washed repeatedly at 60° C. and at 40° C. with 100 ml portions of anhydrous hexane, until there were no chlorine ions in the wash liquid. The solid residue, obtained by vacuum drying, contained 2.15% Ti and 10.2% 2,2-diisobutyl-1,3-dimethoxypropane. The polymerization was carried out according to procedure B.2, using 0.57 g Al($C_2H_5$)$_3$ and 0.25 ml hexane suspension containing 15.0 mg of solid catalyst component. 284 g of polymer was obtained with a polymer yield of 18.9 kg/g catalyst, a 96.1% residue insoluble in xylene at 25° C., a melt index of 4.2 g/10' and a tamped bulk density of 0.35 g/ml.

EXAMPLE 4

In a 350 ml porcelain jar containing 4 porcelain spheres were introduced, under an anhydrous nitrogen environment, 7.65 of anhydrous MgCl$_2$, 2.76 ml 2,2-diisobutyl-1,3dimethoxypropane, and 1.17 ml TiCl$_4$. The jar was placed in a centrifugal mill operated at 350 rpm for 20 hours. In a 350 ml glass reactor, equipped with porous disk for filtration, condenser, mechanical agitator and thermometer, were introduced at room temperature under an anhydrous nitrogen environment, 8 g of the above milled product and 32 ml 1,2-dichloroethane. The contents were heated at 83° C. for 2 hours, then filtered and the solid residue washed 3 times with 50 ml portions of anhydrous hexane. The solid residue obtained by vacuum drying contained 1.5% Ti and 18.4% 2,2-diisobutyl-1,3-dimethoxypropane. Propylene was polymerized according to procedure B.2 using 0.57 g Al($C_2H_5$)$_3$ and 0.5 ml hexane suspension containing 81 mg solid catalyst component. 188 g of polymer was obtained with polymer yield of 2.3 kg/g catalyst component, a 94.7% residue insoluble in xylene, at 25° C. a melt index of 8.4 g/10', and tamped bulk density of 0.29 g/ml.

EXAMPLE 5

In a 500 ml glass flask equipped with a condenser, mechanical agitator and thermometer, were introduced, at room temperature under anhydrous nitrogen atmosphere, 250 ml of TiCl$_4$ and 25 g of a support in the form of spherical particles comprising a styrene-divinylbenzene copolymer impregnated with the $MgCl_2.2Ti(OC_4H_9)_4$ complex, prepared according to the procedure of example 1 of U.S. patent application SN 07/359,234. While agitating, the contents were heated to 100° C. When the temperature reached 40° C., 1.52 ml of 2,2-diisobutyl-1,3-dimethoxypropane was introduced. The temperature was maintained at 100° C. for 1 hour, the solid allowed to settle and the supernatant was removed by siphon. An additional 250 ml $TiCl_4$ was fed into the flask and the contents were heated at 120° C. for 2 hours. After settlement of the solids and siphoning of the supernatant, the solid residue was washed 5 times with 150 ml portions of anhydrous heptane at 85° C., then 3 times with anhydrous hexane at room temperature, until no chlorine ions were formed in the wash liquid. After vacuum drying, the solid catalytic component contained 0.77% Ti and 3.9% 2,2-diisobutyl-1,3-dimethoxypropane. Propylene was polymerized according to procedure A.1 using 0.79 g $Al(C_2H_5)_3$, 1.4 ml hexane suspension containing 49.5 mg solid catalyst component and 1300 ml hydrogen. 400 g of polymer was obtained with a polymer yield of 8.1 kg/g catalyst component, a 95.1% insoluble residue in xylene, at 25° C., melt index of 11.2 g/10' and a tamped bulk density of 0.42 g/ml.

EXAMPLE 6

In a 500 ml glass flask equipped with condenser, mechanical agitator and thermometer were introduced 156.9 ml $Ti(OC_4H_9)_4$ and 20 g anhydrous $MgCl_2$. While agitating, the contents were heated to 140° C. for 3 hours, cooled to 40° C. and the resulting solution was diluted with 157 ml anhydrous heptane. Then 31.5 ml polymethylhydroxyloxane was added (d=0.99 g/ml, Mw=2256). After allowing the solids to settle and siphoning off the supernatant, the solids were washed 3 times with 150 ml portions of anhydrous heptane. At 50° C., 18.4 ml of $SiCl_4$ was added over a 15 minute period, then treated with 2.7 ml 2,2-diisobutyl-1,3-dimethoxypropane and maintained at 50° C. for 2 hours. The solids were allowed to settle, the supernatant removed by siphon and the solids were washed 4 times with 120 ml portions of anhydrous hexane. The residue was treated with 52.3 ml of $TiCl_4$ and then heated at 90° C. for 2 hours. The liquid was removed by siphon after the solids were allowed to settle, the solid residue was washed repeatedly with anhydrous heptane at 60° C. and then 5 times at room temperature, until there were no chlorine ions in the wash liquid. After vacuum drying, the solid catalyst component contained 1.65% Ti and 14.9% 2,2-diisobutyl-1,3-dimethoxypropane. Propylene was polymerized according to procedure B.2 using 0.57 g $Al(C_2H_5)_3$ and 0.4 ml hexane suspension containing 7.9 mg solid catalyst component. 229 g of polymer was obtained with a polymer yield of 29 kg per g of catalyst component, 96.2% insoluble residue in xylene at 25° C. and a tamped bulk density 10 AD of 0.42 g/cc.

EXAMPLE 7

Into a 1 l glass flask equipped with condenser, mechanical agitator and thermometer, under anhydrous nitrogen atmosphere, was introduced 572 ml solution containing 11.4 g $Al(C_2H_5)_3$ for each 100 ml hexane. While agitating, at 5° C., 40 g spherical $MgI_2.2.6C_2H_5OH$ support, prepared according to the method of example 1 in U.S. Pat. No. 4,469,648, was added over 90 minutes, then heated to 60° C. for 3.5 hours, the solids were allowed to settle and the supernatant removed by siphon. The solid residue was washed 10 times with 200 ml portions of anhydrous heptane. To the product obtained, which was diluted to 100 ml with anhydrous heptane, was added over 2 hours at 80° C., 2.7 ml $n-C_4H_9OH$ diluted with 1.5 ml anhydrous heptane. The solids were allowed to settle and the liquid siphoned off. The solid was washed repeatedly with 150 ml portions anhydrous hexane. After vacuum drying the solid showed a Mg content of 20.9% and an $C_2H_5OH$ content of 3.6%. In a 500 ml glass flask was introduced, under an anhydrous nitrogen environment, 362 ml $TiCl_4$, then while agitating at 0° C., 14.5 g of the solid catalyst component obtained above was added. Over a 1 hour period the contents were heated to 100° C. When the temperature reached 40° C., 4.8 ml 2,2-diisobutyl-1,3-dimethoxypropane wa added. The contents were heated at 100° C. for 2 hours. The solids were allowed to settle and the liquid was siphoned off To the solid residue 319 ml of $TiCl_4$ was added, the contents heated to 120° C. for 1 hour, and then the liquid was removed by siphoning after settling. The solid were washed repeatedly with 150 ml portions anhydrous hexane first at 60° C. and then at room temperature. After vacuum drying the solid catalyst component contained 2.45% Ti and 6.3% 2,2-diisobutyl-1,3-dimethoxypropane. Propylene was polymerized according to procedure A.1 using 0.76 g $Al(C_2H_5)_3$, 0.09 ml hexane solution containing 8.9 mg solid catalyst component and 1000 ml hydrogen. 430 g of polymer was obtained with a polymer yield of 51.8 kg/g catalyst component, 90.4% insoluble residue in xylene at 25° C., a melt index of 8.9 g/10' and a tamped bulk density of 0.49 g/ml.

EXAMPLES 8–18 AND COMPARATIVE EXAMPLES 1–3

Into a 500 ml reactor equipped with filtering disk 225 ml $TiCl_4$ was introduced at 0° C. While agitating 10.1 g (54 mmoles) microspheroidal $MgCl_2.2C_2H_5OH$, obtained according to the method of example 1 of U.S. Pat. No. 4,469,648, was added. Upon completing the addition, the temperature was brought to 40° C. and 9 mmoles ether was introduced. The temperature was raised to 100° C. over a one hour period and allowed to react for 2 hours after which the unreacted $TiCl_4$ was removed by filtration. Another 200 ml $TiCl_4$ was added and allowed to react at 120° C. for 1 hour, the reaction mixture was filtered and washed with n-heptane at 60° C. until the chlorine ions disappeared from the filtrate. The ethers used and the analytical data relative to the solid catalyst component obtained in this manner are reported in table 2.

EXAMPLES 19–36 AND COMPARATIVE EXAMPLES 4–6

The polymerization data with the catalysts obtained from the solid catalyst components prepared according to examples 8–18 and comparative examples 1–3 are reported in table 3.

TABLE 2

| Ex. No. | Ether used | Composition of the solid catalyst component % by weight | | |
|---|---|---|---|---|
| | | Mg | Ti | Ether |
| 8 | 2,2-dimethyl-1,3-dimethoxypropane | | 2.6 | 10.40 |

TABLE 2-continued

| Ex. No. | Ether used | Composition of the solid catalyst component % by weight | | |
|---|---|---|---|---|
| | | Mg | Ti | Ether |
| 9 | 2-isopropyl-2-methyl-1,3-dimethoxypropane | 21.7 | 3.24 | 10.44 |
| 10 | 2,2-diisobutyl-1,3-dimethoxypropane | 16.64 | 3.1 | 15.5 |
| 11 | 2,2-diisobutyl-1,3-diethoxypropane | | 4.3 | 8.10 |
| 12 | 2,2-diisobutyl-1,3-di-n-butoxypropane | 16.3 | 5.2 | 2.40 |
| 13 | 2,2-diphenyl-1,3-dimethoxypropane | 14.5 | 5.59 | 11.10 |
| 14 | 2,2-bis (cyclohexylmethyl)-1,3-dimethoxypropane | 14.87 | 4.43 | 11.4 |
| 15 | 1,3-diisobutoxypropane | | 4.7 | 0.005 |
| 16 | 2,2-pentamethylene-1,3-dimethoxypropane | | 2.9 | 15.1 |
| 17 | 1,1-bis (methoxymethyl) bicyclo-(2,2,1)-heptane | | 3.3 | 11.7 |
| 18 | 2-isopentyl-2-isopropyl-1,3-dimethoxypropane | | 2.5 | 14.8 |
| Comp. 1 | 1,3 dimethoxypropane | 18.0 | 1.7 | 10.6 |
| Comp. 2 | 1-isopropyl-2,2-dimethyl 1,3-dimethoxypropane | 17.0 | 4.3 | 0 |
| Comp. 3 | 1-1-dimethoxyethane | 20.8 | 3.0 | 4.0 |

TABLE 3

| Ex. No. | Ether Ex.No. | Polymer Yield g polymer/gCat. comp. | I.I. % | dl/g | Polymerization Method |
|---|---|---|---|---|---|
| 19 | 8 | 3100 | 89.8 | 2.15 | B.2.1. |
| 20 | 9 | 8700 | 93.3 | 2.90 | B.2.1. |
| 21 | 10 | 9300 | 95.3 | | B.2.1. |
| 22 | 11 | 14200 | 79.7 | | B.2.1. |
| 23 | 12 | 13600 | 84.3 | 2.10 | B.2.1. |
| 24 | 13 | 9100 | 84.8 | 2.48 | B.2.1. |
| 25 | 14 | 19000 | 88.4 | 1.65 | B.2.1. |
| 26 | 15 | 20100 | 75.0 | | B.2.1. |
| 27 | 16 | 7100 | 89.3 | | B.2.1. |
| 28 | 17 | 8500 | 79.8 | | B.2.1. |
| 29 | 18 | 11000 | 98.0 | | B.2.1. |
| Comp. 4 | Comp. 1 | 1800 | 64.9 | | B.2.1. |
| Comp. 5 | Comp. 2 | 2000 | 72.0 | 1.0 | B.2.1. |
| Comp. 6 | Comp. 3 | 4300 | 68.1 | 1.77 | B.2.1. |
| 30 (dimethyl dimethoxysilane) | 10 | 8900 | 96.1 | 2.39 | B.2.2. |
| 31 (2,2-diisobutyl-1,3-dimethoxypropane) | 10 | 7900 | 96.3 | 2.00 | B.2.2. |
| 32 (phenyltriethoxysilane) | 10 | 5100 | 97.5 | 2.15 | B.2.2. |
| 33 (2,2-diisobutyl-1,3-dimethoxypropane) | 10 | 33400 | 92.0 | 1.56 | A.1 |
| 34 | 10 | 23200 | 96.0 | 1.71 | A.1.1. |
| 35 (2,2,6,6-tetramethylpiperidine) | 10 | 36600 | 93.8 | 1.83 | A.1.1. |
| 36 (ethyl p-toluate) | 10 | 9600 | 96.6 | 1.94 | A.1.1. |

EXAMPLE 37

A 1.4 stainless steel autoclave, equipped with a thermostat and mechanical agitator, was purged with gaseous propylene at room temperature for 1 hour. Then, while agitating, 66 g of butadiene, 230 g of liquid propylene and 300 ml of hydrogen were fed into the autoclave. Under propylene pressure a catalytic suspension of 0.6 g Al(Et)$_3$ TEAL and 0.048 g solid catalyst component of example 1 were added. The temperature was rapidly brought to 70° C. (in 5 min) and the resulting pressure was 24.6 atm. These conditions were maintained for 4 hours while feeding propylene continuously to replace the portion polymerized. The autoclave was then degassed and cooled to room temperature. 64 g polymer, dried in an oven under nitrogen at 60° C. for 4 hours, was recovered, with a yield of 1333 g polymer per g catalyst. When analyzed, using standard methods, the polymer showed the following characteristics:

[$\eta$] in tetrahydronapththalene at 135° C.=1.8 dl/g.
MIL=4 g/10'
Soluble in xylene at 25° C.=24.1% (weight).
Butadiene content (determined via IR):
 raw polymer=0.6% 1,2; 3.7% 1,4 trans
 insoluble in xylene=0.5% 1,2; 1.6% 1,4 trans
 soluble in xylene= <0.25% 1,2; 8.2 1,4 trans.

EXAMPLE 38

The autoclave and procedure of example 37 were used to polymerize propylene with the solid catalyst component of example 1, but using instead of Al-triethyl, a mixture of 3.3 mmoles Al-triethyl and 3.3 mmoles Al-diethylmonochloride and 0.018 g solid catalyst component. 380 g of polymer was obtained having a polymer yield of 35.2 kg/g of catalyst component, a 94.1% insoluble residue in xylene at 25° C., and a melt index of 7.3 g/10'.

EXAMPLE 39

In the same autoclave used in example 1 was charged at 30° C. and without agitation, a catalyst suspension of 0.9 g Al-triethyl and 0.09 g of the solid catalyst component of example 37 in about 18 ml hexane. Then 800 g propene was introduced with agitation. The temperature was rapidly brought to 75° C., and then 2 atm hydrogen and 200 g butene-1 were introduced. Ethylene was then introduced until the pressure reached 33 atm. These conditions were maintained for 2 hours maintaining constant pressure by continuously feeding in a mixture of ethylene and butene-1 in a weight ratio of 10/1. The autoclave was degassed and cooled at room temperature. The amount of polymer, obtained after drying at 70° C. under nitrogen for 4 hours, was 280 g, which corresponded to a yield of 31.1 kg per g of catalyst component. Analyzed using standard methods, the product showed the following characteristics:
MIE=0.23 g/10' (F/E=26.7)
MIF=6.16 g/10'
Butene (determined via IR)=6% (weight)
Density=0.9211 g/cm$^3$
Soluble in xylene at 25° C.=6.3% (weight)

EXAMPLE 40

In the same autoclave used in example 3 purged as described therein but using ethylene instead of propylene, was introduced at 45° C. under hydrogen flow, a 900 ml solution of 0.5 g/1 of Al-triisobutyl in anhydrous hexane and immediately after 0.015 g of the solid catalyst component of example 1 suspended in 100 ml of the above mentioned solution. The contents were rapidly heated to a temperature of 75° C., then hydrogen was fed into the autoclave until the pressure reached 4.5 atm. These conditions were maintained for 3 hours by continuously replacing the ethylene polymerized. The autoclave was rapidly degassed and cooled at room temperature. The polymer suspension was filtered and the solid was dried at 60° C. under nitrogen for 8 hours. 300 g of polymer was obtained (corresponding to a yield of 20 kg/g of catalyst component) which had the following characteristics (determined by standard methods):

MIE=1.74 g/10' (MIF/MIE=26.5)
MIF=46 g/10'
[η] 135° C. THN=1.78 dl/g
tamped bulk density=0.362 g/ml Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A solid catalyst component for the polymerization of olefins comprising a magnesium dihalide in active form and supported thereon a titanium compound containing at least one Ti-halogen bond and an electron-donor compound selected from ethers containing two or more ether groups and further characterized by the formation of complexes with anhydrous magnesium dichloride in an amount less than 60 mmoles per 100 g of magnesium dichloride and by the failure to enter into substitution reactions with TiCl$_4$ or of reacting that way at less than 50% by moles.

2. The solid catalyst component of claim 1 wherein the ethers are complexed in quantities between 20 and 50 mmoles per 100 g of magnesium dichloride.

3. The solid catalyst component of claim 1 wherein the ethers are selected from diethers with the following general formula:

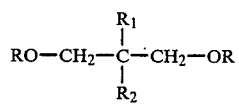

where R, R$_1$ and R$_2$, independently, are linear or branched alkyl, cycloaliphatic, aryl, alkylaryl or arylalkyl radicals with 1–18 carbon atoms and R$_1$ or R$_2$ may also be hydrogen.

4. The solid catalyst component of claim 3 wherein R is methyl, and when R$_1$ is methyl, ethyl, propyl or isopropyl, R$_2$ is ethyl, propyl, isopropyl, butyl, isobutyl, t-butyl, 2-ethylhexyl, cyclohexyl, methylcyclohexyl, phenyl or benzyl, and when R$_1$ and R$_2$ are the same, they are ethyl, propyl, isopropyl, butyl, isobutyl, t-butyl, neopentyl, isopentyl, phenyl, benzyl or cyclohexyl.

5. The solid catalyst component of claim 3 wherein R is methyl and R$_1$ and R$_2$ are different and are isopropyl, isobutyl, t-butyl, cyclohexyl, isopentyl or cyclohexylethyl.

6. The solid catalyst components of claim 3 where the ethers are selected from the group consisting of 2,2-diisobutyl-1,3-dimethoxypropane, 2-isopropyl-2-isopentyl-1,3-dimethoxypropane, 2,2-bis(cyclohexylmethyl)-1,3-dimethoxypropane, and 2,2-bis(cyclohexylmethyl)-1,3-dimethoxypropane.

7. The solid catalyst component of claim 1 wherein the titanium compound is selected from the group consisting of the halo alcoholates and the halides of titanium and the magnesium dihalide is magnesium dichloride.

8. The solid catalyst component of claim 3 wherein the titanium compound is selected from the group consisting of the halo alcoholates and the halides of titanium and the magnesium halide is magnesium dichloride.

9. The solid catalyst component of claim 1 wherein the titanium compound is titanium tetrachloride.

10. The solid catalyst component of claim 3 wherein the titanium compound is titanium tetrachloride.

11. The solid catalyst component of claim 7 wherein the magnesium dichloride is present in active form characterized in that in the X-ray powder spectrum of the catalyst component a halo appears instead of the most intense diffraction line which appears at an interplanar distance of 2.56 Å in the non-activated magnesium dichloride, and the maximum intensity of the halo is shifted with respect to said interplanar distance.

12. The solid catalyst component of claim 8 wherein the magnesium dichloride is present in active form characterized in that in the X-ray powder spectrum of the catalyst component a halo appears instead of the most intense diffraction line which appears at an interplanar distance of 2.56 Å in the non-activated magnesium dichloride, and the maximum intensity of the halo is shifted with respect to said interplanar distance.

13. The solid catalyst component of claim 3 wherein the ether is present in an amount from 5 to 20% mmoles with respect to the magnesium dihalide.

14. The solid catalyst component of claim 3 wherein the Mg/Ti ratio is between 30:1 and 4:1.

15. The solid catalyst component of claim 1 wherein the magnesium dihalide is magnesium dichloride in active form which is obtained from MgCl$_2$ complexes with alcohols or titanium alcoholates, or from alcoholates and chloroalcoholates of magnesium.

16. The solid catalyst component of claim 3 wherein the magnesium dihalide and the titanium compound are supported on resins and the Mg/Ti ratio is from 2:1 to 3:1.

17. A catalyst for the polymerization of olefins CH$_2$=CHR, wherein R is H, an alkyl radical with 1–6 carbon atoms or an aryl radical, or mixtures thereof with or without a diolefin, comprising the product obtained by reaction of a solid catalyst component of claim 3 with an Al-alkyl compound.

18. The catalyst of claim 17 wherein the Al-alkyl compound is an Al-trialkyl.

19. The catalyst of claim 17 which further comprises an electron donor compound selected from the group consisting of silicon compounds containing at least one Si-OR bond wherein R is a hydrocarbyl radical.

20. The catalyst of claim 18 which further comprises an electron donor compound selected from the group consisting of silicon compounds containing at least one Si-OR bond wherein R is a hydrocarbyl radical.

* * * * *

UNITED STATES PATENT AND TRADEMARK OFFICE
CERTIFICATE OF CORRECTION

PATENT NO. : 4,971,937

DATED : November 20, 1990

INVENTOR(S) : Enrico Albizzati et al.

It is certified that error appears in the above-identified patent and that said Letters Patent is hereby corrected as shown below:

At col. 1, line 18, change "to" to --in--.

At col. 2, line 51, change "2-methyl2-ethyl-1,3-dimethoxypropane" to --2-methyl-2-ethyl-1,3-dimethoxypropane--.

At col. 2, lines 53 & 54, change "2-methyl2-phenyl-1,3-dimethoxypropane" to --2-methyl-2-phenyl-1,3-dimethoxypropane--.

At col. 3, line 5, change "dibenzyl1,4-diethoxybutane," to --dibenzyl-1,4-diethoxybutane,--.

At col. 3, line 12, change "diisopropyl1,5-dimethoxypentane," to --diisopropyl-1,5-dimethoxypentane,--.

At col. 3, line 32, change "thyl1,3-dimethoxypropane" to --thyl-1,3-dimethoxypropane--.

At col. 8, line 36, change "wa" to --was--.

At col. 9, line 38, change "2.6%" to --12.6%--.

At col. 10, line 2, change "2,2-diisobutyl1,3-dimethoxypropane" to --2,2-diisobutyl-1,3-dimethoxypropane--.

At col. 10, line 44, change "diisobutyl-1,3dimethoxypropane" to --diisobutyl-1,3-dimethoxypropane--.

At col. 11, line 67, change "$Mgl_2.2.6C_2H_5OH$" to --$MgCl_2.2.6C_2H_5OH$--.

At col. 12, line 18, change "wa" to --was--.

UNITED STATES PATENT AND TRADEMARK OFFICE
CERTIFICATE OF CORRECTION

PATENT NO. : 4,971,937

DATED : November 20, 1990

INVENTOR(S) : Enrico Albizzati et al.

It is certified that error appears in the above-identified patent and that said Letters Patent is hereby corrected as shown below:

At col. 12, line 23, change "solid" to --solids--.

Signed and Sealed this

Twenty-eighth Day of July, 1992

Attest:

DOUGLAS B. COMER

Attesting Officer     Acting Commissioner of Patents and Trademarks